J. KUNST.
NOODLE MAKING DEVICE.
APPLICATION FILED AUG. 7, 1916.
1,301,065.
Patented Apr. 15, 1919.
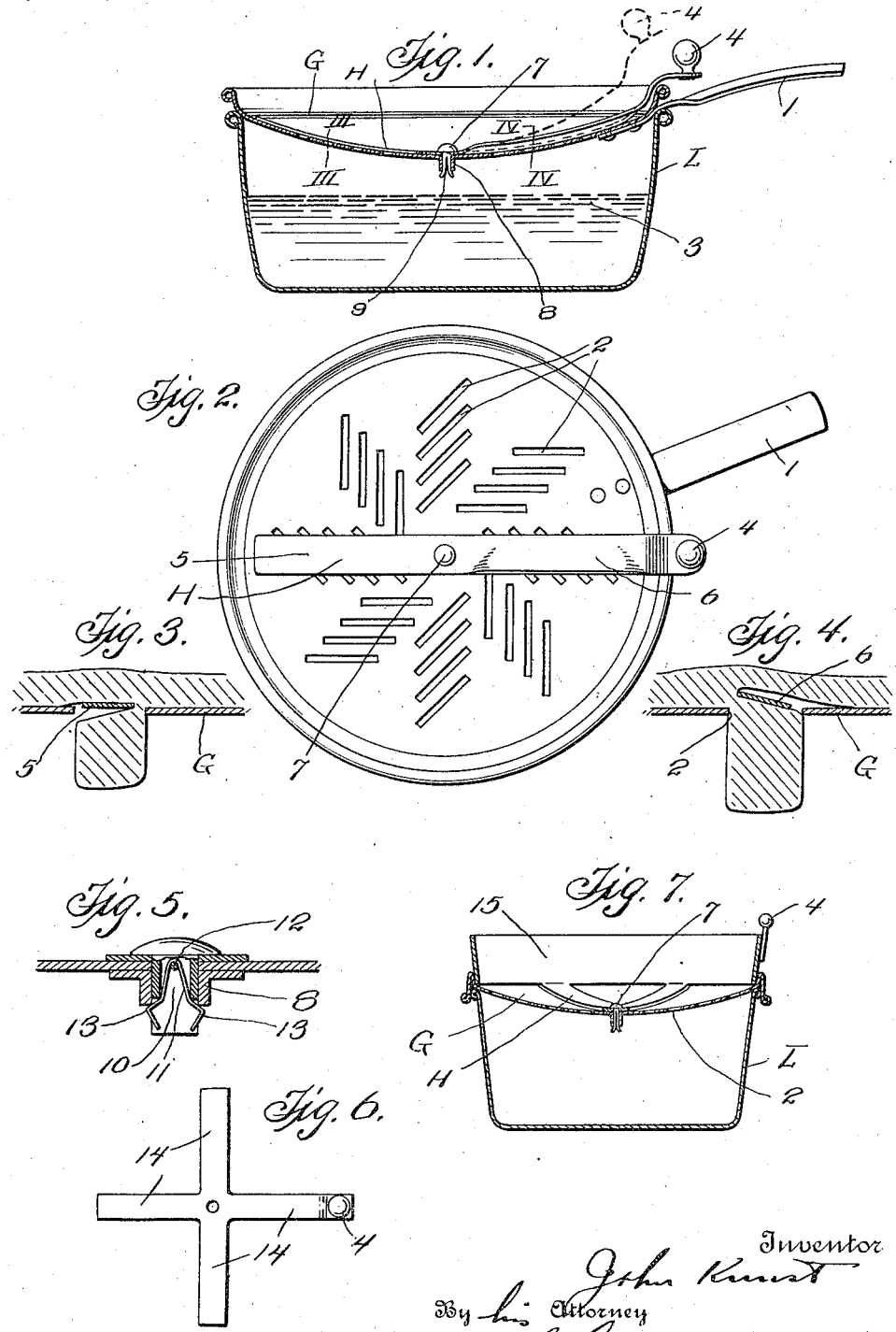

UNITED STATES PATENT OFFICE.

JOHN KUNST, OF NEW YORK, N. Y.

NOODLE-MAKING DEVICE.

1,301,065.  Specification of Letters Patent.  Patented Apr. 15, 1919.

Application filed August 7, 1916. Serial No. 113,533.

*To all whom it may concern:*

Be it known that I, JOHN KUNST, residing at New York, in the county and State of New York, have invented certain new and useful Improvements in Noodle-Making Devices, of which the following is a specification.

This invention relates to a noodle making device and the object thereof is to provide a simple, practical and highly efficient form for this purpose adapted either for domestic, or for hotel use, or even for manufacturing purposes.

A further object is to provide a device in which noodles may be rapidly and correctly made.

Other objects and aims of the invention, more or less specific than those referred to above, will be in part obvious and in part pointed out in the course of the following description of the elements, combinations, arrangements of parts and applications of principles, constituting the invention; and the scope of protection contemplated will be indicated in the appended claims.

In the accompanying drawings which are to be taken as a part of this specification, and in which I have shown a merely preferred form of embodiment of the invention:

Figure 1 is a vertical central sectional view taken through a device constructed in accordance with the principles of this invention.

Fig. 2 is a top plan view of the device shown in Fig. 1.

Fig. 3 is a detail sectional view taken upon the plane of line III—III of Fig. 1 illustrating the manner in which the noodles are formed and cut.

Fig. 4 is a similar view taken upon the plane of line IV—IV of Fig. 1.

Fig. 5 is an enlarged fragmentary detail view illustrating a modification.

Fig. 6 is a top plan view illustrating a further modification; and

Fig. 7 is a view similar to that shown in Fig. 1, except on a smaller scale, illustrating a further modification.

Referring to the drawings for a detailed description of the structure illustrated therein, the reference character L indicates a container or boiler, constituting the lower member of the device. The reference numeral G indicates a pan-like cover for the boiler L, forming the upper part of the device. The reference character H indicates a rotary knife or cutter which is pivotally mounted at the center of the upper surface of cover G.

The cover G is of a size to fit upon the upper annular edge of the container L and a suitable handle 1 is provided upon the cover by means of which it may be readily manipulated.

The material forming the bottom wall of the cover is perforated, as at 2, and said bottom wall is preferably made concave so as to better hold the dough to be operated upon and so as to better coöperate with the knife H, as will be pointed out.

In operation a quantity of dough is placed within the pan G, the dough being of such consistency as to gradually flow through the openings 2. The knife H is disposed in close contact with the upper surface of the bottom wall of the pan and by swinging the same about its pivotal connection that portion of the dough which has passed through the openings 2 will be cut off and allowed to fall into the water 3 within the container L.

It is intended that the water 3 shall be in a heated condition so as to cook the dough more or less and thereby cause it to maintain the shape imparted to it by passing through the openings 2. The various pieces of the dough will also be prevented from connecting themselves together.

Of course, it will be understood that the openings 2 may be of any desired distinctive shape and disposition within the spirit of the invention.

A suitable handle 4 is provided at one end of the knife H by means of which the knife may be readily rotated.

As illustrated the knife comprises a member which is pivoted by approximately its center portion so that both of the end portions thereof, as 5 and 6, constitute cutters. If desired, one of these cutters may be omitted. The two cutters, however, serve to improve the action of each other to a certain extent by rendering the motion smoother and also by maintaining both cutters in better engagement with the upper surface of the pan.

Both cutters 5 and 6 may be of the same shape, if desired, but it is preferable that one thereof, as 6, be arranged at a bevel so that it will serve, when rotated in one direction, as a sort of wedge to force the dough downwardly through the openings 2, in the manner suggested by Fig. 4. When the knife is rotated in the opposite direction both ends thereof will serve as cutters, whereas when the knife is rotated in the first direction one end only will serve as a cutter and the opposite end will serve as a wedge. By holding the handle 4 pressed downwardly the cutter 6 will be held in tight engagement with the bottom wall of the pan and may be made to serve as a cutter even when rotated in its wedge-acting direction. By raising the handle, however, as suggested by the dotted lines in Fig. 1, the cutter 6 will act simply as a wedge.

In structures where the cutter 5 is omitted and the cutter 6 is arranged at an incline, said cutter 6 may be held elevated and rotated for any number of times so as to cause the noodles to become as long as desired. When they have attained a desirable length the cutter can be pressed downwardly and the noodles severed.

In some instances, especially where the knife is made to form only a single cutter, the cutter may be normally bowed upon a curve having a less radius than the curve of the bottom wall of the pan so that the handle end will normally stand elevated, substantially as indicated also by the dotted line in Fig. 1. In operating this cutter it can be allowed to remain in its normal position to act as a wedge, or it can be pressed down more or less, as desired. When fully pressed down it will form a tight, smooth and effective engagement with the surface of the pan owing to the resiliency of the cutter.

It is desirable that the knife may be readily attached or detached at the point of its pivotal engagement with the pan, and for this purpose the pivotal connection is provided by the use of a spring rivet 7, the head of which overlies the upper surface of the knife and the shank of which extends through an aperture in the knife and downwardly through a sleeve 8 formed upon the pan. The shank is bifurcated to form spring legs which are spread apart at their lower end, as at 9, so as to engage beneath the lower end of the sleeve 8. To remove the knife it is simply necessary to apply force to squeeze the spring legs upwardly through the sleeve 8.

In Fig. 5 of the drawings a modified form of spring rivet is illustrated. In this instance the shank of the rivet is formed with a pocket 10 therein within which is arranged a U-shaped spring 11 retained by cross pin 12. The legs of the spring project downwardly and the lower portions thereof are bent to form inclined shoulder portions 13 disposed to project outwardly for engaging beneath the lower end of the sleeve 8.

In the modification Fig. 6 the knife is shown as comprising four distinct cutters 14. One of these is provided with the handle 4.

In the modification Fig. 7 the knife is provided with an annular marginal band portion 15 which is connected to the ends of the cutters so as to provide a relatively deep pan-like arrangement for better retaining the dough against accidental overflow. By this arrangement larger quantities of dough may be handled with facility.

Having thus described my invention what I claim as new and desire to secure by Letters Patent is:

1. A noodle making device comprising a pan-like structure adapted to contain a quantity of dough, the bottom wall of said structure being perforated to permit portions of the dough to extend therethrough, and a cutter for cutting off the portions of dough extending through said perforations, said cutter comprising a member adapted to be moved transversely across the perforations and being flexible to permit its being bent to move portions thereof closer to or farther from the perforated bottom wall, for the purpose set forth.

2. A noodle making device comprising a pan-like structure adapted to contain a quantity of dough, the bottom wall of said structure being perforated to permit portions of the dough to extend therethrough, and a cutter for cutting off the portions of dough extending through said perforations, said cutter comprising a member adapted to be moved transversely across the perforations in two directions and having an angularly disposed part operative, when the cutter is moved in one direction, to wedge the dough through the perforations, and operative, when the cutter is moved in the opposite direction, to cut off the dough which has been wedged through the perforations, and said cutter being flexible to permit its being bent to move portions thereof farther from or closer to the perforated bottom wall at will.

3. A noodle making device comprising a pan-like structure adapted to contain a quantity of dough, the bottom wall of said structure being perforated to permit portions of the dough to extend therethrough, and a cutter for cutting off the portions of dough extending through said perforations, said cutter comprising a strip of material pivotally connected with said structure to be swung back and forth across said perforations, said cutter having an angularly disposed part operative as a wedge to force the dough through the perforations when the cutter is swung in one direction and as a knife to cut off the dough which extends through the perforations when the cutter is swung in the opposite direction, and the cutter being flexible to permit of its being bent to move its angularly disposed portion closer to or farther from the perforated bottom wall, for the purpose set forth.

4. A noodle making device comprising a pan-like structure adapted to contain a quantity of dough, the bottom wall of said structure being perforated to permit portions of the dough to extend therethrough, a cutter for cutting off the portions of dough extending through said perforations, the cutter comprising a member pivotally mounted to swing transversely across the perforations, said member at one side of the pivot thereof being disposed to rest substantially flat against the bottom wall to cut off the dough as said member is swung, and said member at the opposite side of the pivot being disposed at an angle to the surface of the bottom wall to serve as a wedge for forcing the dough through the perforations as said member swings, and the last mentioned portion of said member being flexible to permit of its being bent to move the angularly disposed portion closed to or farther from the bottom wall at will.

5. A noodle making device comprising a pan-like structure adapted to contain a quantity of dough, the bottom wall of said structure being perforated to permit portions of the dough to extend therethrough, and a cutter for cutting off the portions of dough extending through said perforations, said cutter comprising a strip of material extending transversely across the bottom wall of said structure and being pivotally connected at approximately the center of said bottom wall by its intermediate portion so as to provide two parts one at each side of said pivot for operating upon the dough when the cutter is rotated about the pivot, one of said parts being disposed flat upon the surface of the bottom wall to serve only as a cutter while the other of said parts is disposed at an angle to the surface of the bottom wall to serve as a wedge for forcing the dough through the perforations.

In testimony whereof I affix my signature in the presence of two witnesses.

JOHN KUNST.

Witnesses:
L. GESSFORD HANDY,
GUSTAV GENZLINGER.

Copies of this patent may be obtained for five cents each, by addressing the "Commissioner of Patents, Washington, D. C."